United States Patent
Futohashi

(10) Patent No.: US 7,450,971 B2
(45) Date of Patent: Nov. 11, 2008

(54) TELECOMMUNICATION TERMINAL APPARATUS

(75) Inventor: Ichiro Futohashi, Hamakita (JP)

(73) Assignee: Yamaha Corporation, Hamamatsu (JP)

( * ) Notice: Subject to any disclaimer, the term of this patent is extended or adjusted under 35 U.S.C. 154(b) by 371 days.

(21) Appl. No.: 10/724,789

(22) Filed: Dec. 1, 2003

(65) Prior Publication Data

US 2004/0176149 A1    Sep. 9, 2004

Related U.S. Application Data

(63) Continuation of application No. PCT/JP02/04952, filed on May 22, 2002.

(30) Foreign Application Priority Data

May 28, 2001    (JP) ............... 2001-158993

(51) Int. Cl.
*H04Q 7/20* (2006.01)
(52) U.S. Cl. .................. 455/567; 455/440; 455/425; 455/550.1; 84/601; 84/609; 84/618; 84/649; 84/656; 379/67.1; 379/69; 379/142.11
(58) Field of Classification Search ............... 379/375, 379/373, 67.1, 69, 142.11; 455/567, 550.1, 455/440, 425; 84/601, 609, 618, 649, 656
See application file for complete search history.

(56) References Cited

U.S. PATENT DOCUMENTS 5,452,354 A * 9/1995 Kyronlahti et al. ..... 379/373.02
6,058,171 A * 5/2000 Hoopes ................. 379/142.01
6,418,330 B1 * 7/2002 Lee ........................... 455/567
6,597,928 B2 * 7/2003 Ito ............................. 455/567
6,947,728 B2 * 9/2005 Tagawa et al. ........... 455/414.1
2004/0076278 A1 * 4/2004 Hayakawa et al. ..... 379/207.16

FOREIGN PATENT DOCUMENTS

| GB | 2353442 A | * | 2/2001 |
| JP | 2000-338979 A | | 12/2000 |
| JP | 2001-060991 A | | 3/2001 |
| JP | 2002-185570 A | | 6/2002 |

\* cited by examiner

*Primary Examiner*—Nay Maung
*Assistant Examiner*—Richard Chan
(74) *Attorney, Agent, or Firm*—Pillsbury Winthrop Shaw Pittman LLP

(57) ABSTRACT

A CPU 10 operates in response to an instruction for starting reproduction of a melody to read out tone color data and tempo data included in selected musical composition data from a RAM 11 or a ROM 12, and transfer the readout data to a musical tone-generating section 15. The CPU 10 then reads out starting position information written in a performance starting point register 36, reads out note data included in the musical composition data from a position indicated by the starting position information from the RAM 11 or the ROM 12, and transfers the readout note data to the musical tone-generating section 15. The musical tone-generating section 15 generates a melody from the transferred note data based on the transferred tone color data and tempo data. As a result, the melody can be listened to from an arbitrary starting position.

5 Claims, 7 Drawing Sheets

US 7,450,971 B2

TELECOMMUNICATION TERMINAL APPARATUS

RELATED APPLICATIONS

This application is a continuation of PCT application No. PCT/JP02/04952, filed May 22, 2002, which is based upon, and claims priority from, Japanese Patent Application No. 2001-158993, filed May 28, 2001.

TECHNICAL FIELD

The present invention relates to a telecommunication terminal apparatus which is capable of giving a notification using a melody, and more particularly to a telecommunication terminal apparatus which can be suitably applied to a car telephone and a cellular phone.

BACKGROUND ART

In a mobile telecommunication system such as a PDC (Personal Digital Cellular) telecommunication system, known as an analog cellular system or a digital cellular system, and a PHS (Personal Handy-phone System), when a cellular phone carried by the user receives an incoming call, an alert sound is generated to notify the user of the incoming call. As the alert sound, a beep has been conventionally used, but recently, a melody has come to be used in place of the beep since the beep is offensive to the ear.

A conventional cellular phone, which is capable of reproducing a melody as mentioned above, is equipped with a musical tone-reproducing means that is capable of playing automatic performance of a musical composition. The musical tone-reproducing means is generally comprised of a CPU (Central Processing Unit), a ROM (Read Only Memory), a RAM (Random Access Memory), and a musical tone-reproducing section. The CPU executes an automatic performance program read from the ROM, thereby reading data of a musical composition from the ROM or the RAM, and setting tone generation parameters to the musical tone-reproducing section to reproduce the musical composition.

To produce high-quality musical tones, some of the recent musical tone-reproducing means are equipped with a plurality of sounding channels so that they can reproduce a musical composition composed of a plurality of parts via the plurality of channels.

The conventional telecommunication terminal apparatus such as a cellular phone, however, is adapted to reproduce a melody for notifying the user of an incoming call or a call-hold from the leading end of a musical composition designated in advance, and hence it is difficult for the user to listen to the entire musical composition.

It is therefore an object of the present invention to provide a telecommunication terminal apparatus which is capable of giving a notification using a melody, and reproducing the melody from an arbitrary position of a musical composition.

DISCLOSURE OF THE INVENTION

To attain the above object, there is provided a telecommunication terminal apparatus capable of giving a notification using a melody, comprising storage means capable of storing musical composition data in which a plurality of starting points suitable for starting performance are set, point register means for storing information indicative of an arbitrary performance starting position of the musical composition data and musical tone-generating means responsive to an instruction for starting the notification using the melody, for reading out the musical composition data from the storage means and for reproducing the readout musical composition according to the information indicative of the performance starting position, stored in the point register means, to thereby start generating the melody from the arbitrary performance starting position of the musical composition data.

Preferably, in the telecommunication terminal apparatus according to the present invention, the musical tone-generating means is responsive to an instruction for ending the notification using the melody, for stopping reproducing the musical composition data and for writing information indicative of a reproduction stop position of the musical composition data having been reproduced and a starting point corresponding to a position closest to the reproduction stop position among the plurality of starting points into the point register means.

Preferably, in the telecommunication terminal apparatus according to the present invention, the musical tone-generating means is responsive to an instruction for ending the notification using the melody, for stopping reproducing the musical composition data and for writing information indicative of a reproduction stop position of the musical composition data having been reproduced and a starting point corresponding to a rear position closest to the reproduction stop position among the plurality of starting points into the point register means.

More preferably, in the telecommunication terminal apparatus according to the present invention, the musical tone-generating means is responsive to the instruction for starting the notification using the melody, for generating the melody from a starting point corresponding to a rear position closest to the performance starting position stored in the point register means among the plurality of starting points.

More preferably, in the telecommunication terminal apparatus according to the present invention, one starting point can be selected from among the plurality of starting points, and the selected one starting point is written as the performance starting position into the point register means.

According to the present invention constructed above, the telecommunication terminal apparatus has the point register means for storing information indicative of an arbitrary performance starting position of musical composition data, so that in response to an instruction for starting generation of a notification sound, the musical composition data is read out and reproduced according to the information indicative of the performance starting position stored in the point register means. Therefore, it is possible to reproduce and listen to musical composition data from an arbitrary position thereof.

Further, when an instruction for ending generation of a notification sound, information indicative of a reproduction ending position of musical composition data having been reproduced and the starting point closest to a notification sound ending position is written into the point register means, so that the musical composition data can be reproduced from a position suitable for starting performance. In this case, when an instruction for starting generation of a notification sound is given, musical composition data may be reproduced from a starting point closest to a position stored in the point register means.

Further, one starting point is selected from among the plurality of starting points, the selected one starting point is written into the point register means as an arbitrary performance starting position, musical composition data may be reproduced from the selected one starting point.

BEST MODE FOR CARRYING OUT THE INVENTION

The present invention will now be described in detail with reference to the drawings showing a preferred embodiment thereof.

Figure 1:
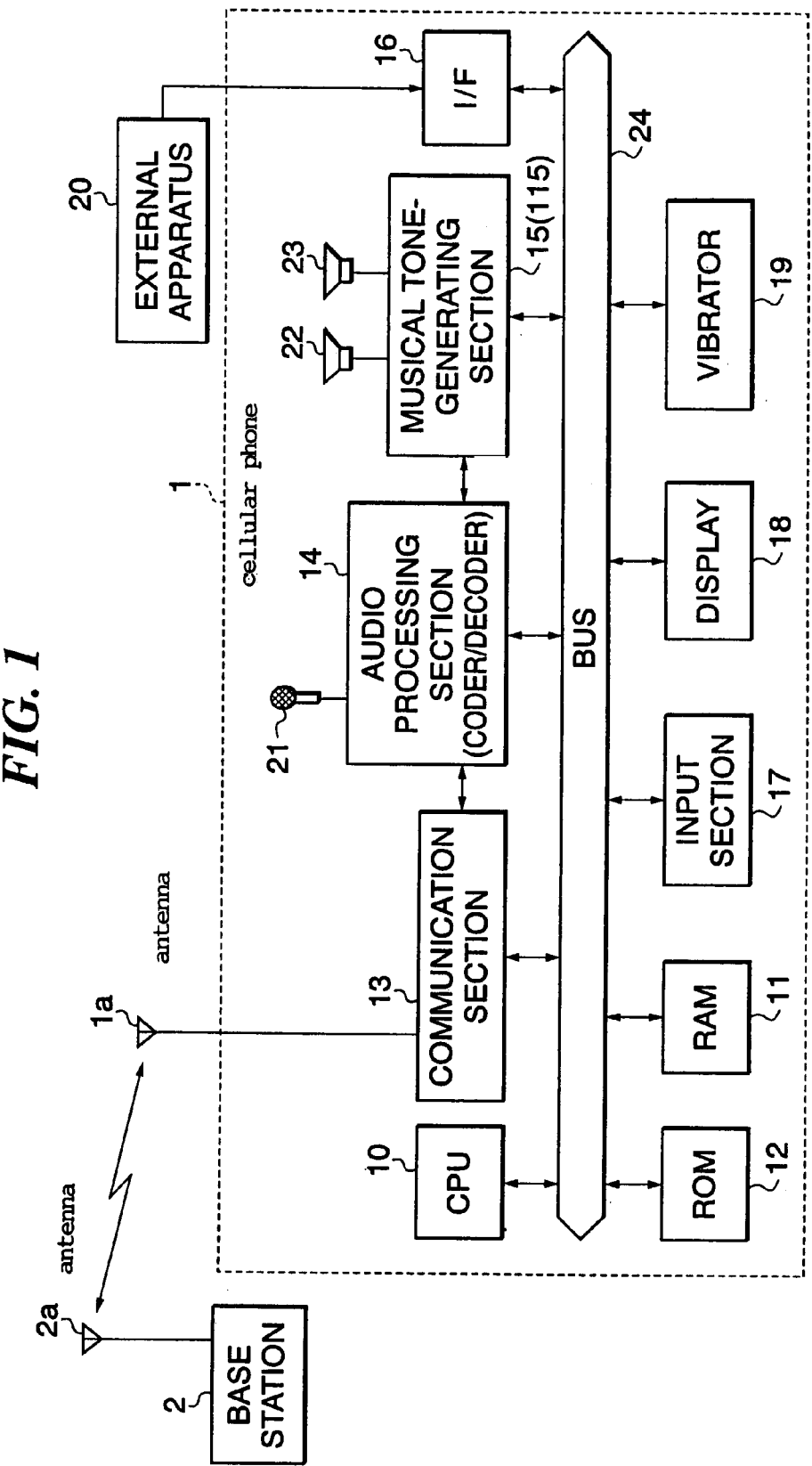
FIG. 1 is a diagram showing an example of the arrangement of a cellular phone as a telecommunication terminal apparatus according to an embodiment of the present invention.

FIG. 1 shows an example of the arrangement of a cellular phone to which a telecommunication terminal apparatus according to an embodiment of the present invention is applied.

A cellular phone 1 in FIG. 1 includes a known antenna 1a, which is usually configured to be retractable and connected to a communication section 13 having a modulating/demodulating function. A CPU 10 functions as a system controller that controls the operations of various component parts of the cellular phone 1 by executing telephone function programs, and includes a timer, not shown, for indicating a time period elapsed during operation thereof and generating a timer interrupt at predetermined time intervals. Further, the CPU 10 carries out a musical composition reproduction-related process, described later. A RAM 11 has a musical composition data storage area for storing data of musical compositions each composed of a plurality of parts downloaded from a download center or the like, a user setting data storage area, a work area for operation of the CPU 10, and so forth. A ROM 12 stores various telephone function programs for transmissions and receptions and other programs for carrying out the musical composition reproduction-related process, and other programs, which are executed by the CPU 10, and various data such as preset musical composition data.

The communication section 13 carries out demodulation of a signal received by the antenna 1a, and modulation of a signal to be transmitted via the antenna 1a to supply the modulated signal to the antenna 1a. A received speech signal demodulated by the communication section 13 is decoded by an audio processing section (coder/decoder) 14, while a sending speech signal input via a microphone 21 is compression-encoded by the audio processing section 14. The audio processing section 14 carries out compression-encode/decode of speech with high efficiency, and is implemented by a coder/decoder based on a CELP (Code Excited Linear Prediction) method or an ADPCM (Adaptive Differential Pulse Code Modulation) method. A musical tone-generating section 15 outputs the received speech signal from the audio processing section 14 and causes the received speech signal to be sounded via a received speech speaker 22, or reproduces musical composition data to generate and output an incoming call melody and a hold sound. It should be noted that the incoming call melody is sounded via an incoming call speaker 23, while the hold sound is mixed with a received speech signal and sounded via the received speech speaker 22.

The musical composition data is comprised of tone color data, tempo data, and note data composed of a plurality of parts. The musical tone-generating section 15 is adapted to reproduce musical tones based on the musical composition data, and has a FIFO (First-In First-Out) memory incorporated therein, for storing the note data during the reproduction of the musical composition data. The FIFO memory may have such a storage capacity as to store note data of one musical composition, but it may be configured such that if the FIFO memory has a storage capacity which is too small to store note data of one musical composition, the musical tone-generating section 15 sends an interrupt request (IRQ) signal to the CPU 10 when a predetermined amount of a free area occurs in the FIFO memory, and in response to the IRQ signal, the CPU 10 reads out a continued portion of the note data stored in the RAM 11 or the ROM 12 and transfers the same to the musical tone-generating section 15.

An interface (I/F) 16 provides interface for downloading data of musical composition data composed of one or more pieces of sequence data from an external device 20 such as a personal computer. An input section 17 is comprised of dial buttons for inputting "0" to "9", respectively, and other buttons, which are provided in the cellular phone 1. A display 18 displays a menu of telephone functions, and images associated with operations of respective buttons including the dial buttons. A vibrator 19 vibrates the body of the cellular phone 1 upon receipt of an incoming call instead of producing an alert sound to thereby notify the user of the incoming call. It should be noted that the above described functional blocks send and receive data and instructions to and from each other via a bus 24.

Figure 2:
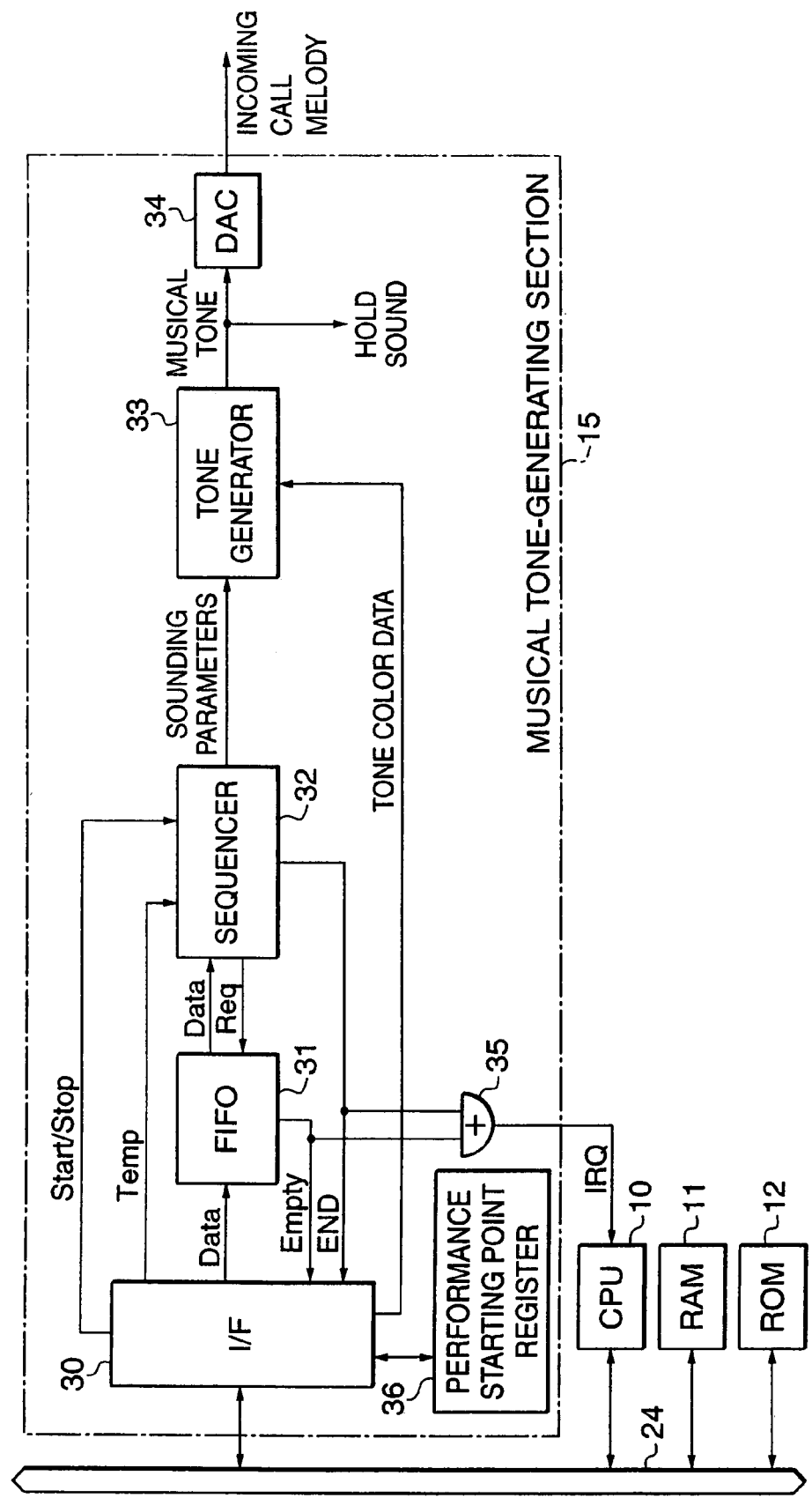
FIG. 2 is a diagram showing a first configuration of a musical tone-generating section of the cellular phone in FIG. 1.

FIG. 2 shows a first configuration of the musical tone-generating section 15 of the cellular phone 1 according to the present embodiment. According to the first configuration, the musical tone-generating section 15 has a sequence function. Before describing the first configuration, the data structure of musical composition data which is reproduced by the musical tone-generating section 15 will be described by referring to FIG. 3.

Figure 3:
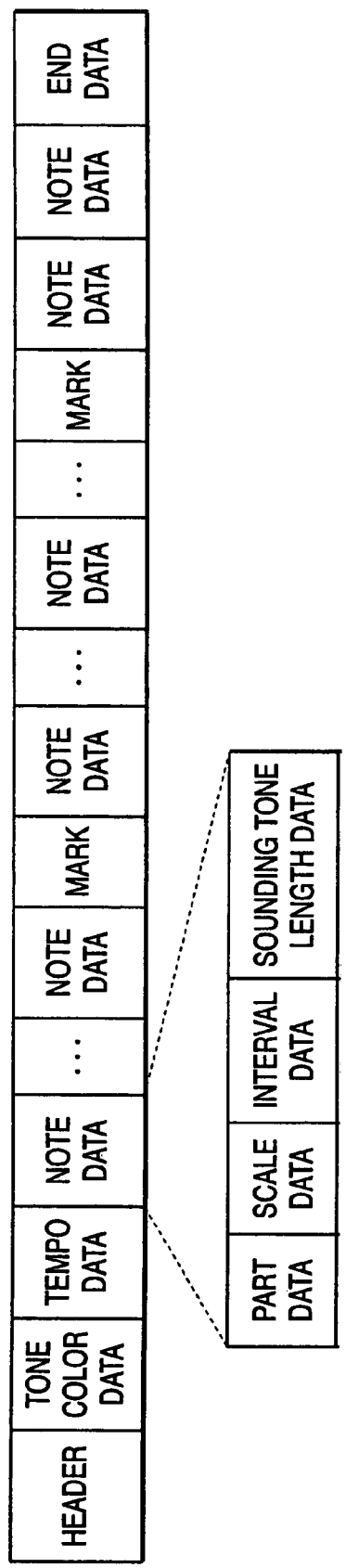
FIG. 3 is a diagram showing the data structure of musical composition data which is reproduced by the musical tone-generating section in FIG. 2.

The musical composition data in FIG. 3 is stored in the RAM 11 or the ROM 12. As shown in FIG. 3, the musical composition data is formed of a header located at the leading end, and tone color data, tempo data, note data, and end data, which are arranged in this order. The note data is formed of note data of respective parts sequentially arranged; as shown in FIG. 3, note data of each part is comprised of part data indicative of the corresponding part, scale data comprised of note information and octave information, interval data indicative of a time interval between the present note data and the next note data, and sounding tone length data comprised of tone length information indicative of a quarter note, an eighth note, or the like. It should be noted that a pause (rest) is represented by the interval data.

The resolution of the interval data and the tone length data constituting the note data depends on the tempo data; if the tempo data varies, the actual period of time corresponding to a value of the interval data or a value of the tone length data also varies even if the value of the interval data or the value of the tone length data remains unchanged. Further, a plurality of marks are inserted into the musical composition data such that they are located at positions suitable for starting performance. These marks may be inserted into the musical composition data such that they are located at the leading end of an introduction pattern, a main pattern, a fill-in pattern, an ending pattern, and the like.

Further, end data is disposed at the trailing end of the musical composition data. Upon detection of the end data, it can be detected that reproduction of the musical composition data has been completed. Therefore, if there is musical composition data to be reproduced next, preparations can be made for reproducing the same.

Further, the musical composition data is comprised of a plurality of parts, e.g. four parts: a melody part, an accompaniment part 1, an accompaniment part 2, and a rhythm part. The musical composition data can be downloaded from a distribution center or the like via e.g. a base station 2 appearing in FIG. 1. The downloaded musical composition data is stored in the RAM 11. It should be noted that the base station 2 is provided with a base station antenna 2a.

The cellular phone 1 according to the present embodiment is capable of starting reproduction of musical composition data having the data structure shown in FIG. 3 from an arbitrary position thereof. In this case, a reproduction starting position of the musical composition data is a performance starting position of the musical composition data, which is indicated by performance starting position information stored in a performance starting point register 36 of the musical tone-generating section 15.

As shown in FIG. 2, the musical tone-generating section 15 is comprised of an interface (I/F) 30, a FIFO 31, a sequencer 32, a tone generator 33, a digital-to-analog converter (DAC) 34, and an OR circuit 35.

The interface 30 is connected to the CPU 10 via the bus 24, so that musical composition data read out from the RAM 11 or the ROM 12 under the control of the CPU 10 is written into a data register incorporated in the interface 30 via the bus 24. In this case, the CPU 10 reads out tone color data and tempo data included in the musical composition data, and transfers the readout data to the interface 30. The CPU 10 then reads out performance starting position information from the performance starting point register 36 so that the musical composition data to be reproduced can be read out from a position corresponding to the performance starting position information. The CPU 10 then transfers note data of the readout musical composition data located at and after the performance starting position to the interface 30.

The note data (Data) of the readout musical composition data located at and after the performance starting position written in the data register incorporated in the interface 30 is written into the FIFO 31, and the tone color data of each part included in the musical composition data written in the data register is transferred to the tone generator 33.

Registers incorporated in the interface 30 include a sequencer control register, the data register, and a status register.

The sequencer control register is a register into which sequencer control data for controlling the sequencer 32 is written under the control of the CPU 10. The sequencer control data written into the sequencer control register includes sequencer start instruction data (Start) which instructs the sequencer 32 to start reproducing musical tones, and a sequencer stop instruction data which instructs the sequencer 32 to stop reproducing musical tones.

The data register is a register into which musical composition data is temporarily written under the control of the CPU 10. In the musical composition data written in the data register, note data located at and after a performance starting position is written into the FIFO 31, tone color data is written into the tone generator 33, and tempo data (Temp) is transferred to the sequencer 32.

The status register is a register in which a musical tone-generating status of the musical tone-generating section 15 is set. The musical tone-generating status set in the status register includes a note data empty flag (Empty) output from the FIFO 31 and a musical composition data end flag (END) output from the sequencer 32. The musical tone-generating status is read out from the status register by the CPU 10.

The FIFO 31 has a capacity of 32 bytes (32_8 bits), for example. Note data of the selected musical composition data located at and after a performance starting position are sequentially written into the FIFO 31 via the data register of the interface 30 under the control of the CPU 10, and in response to a readout request signal (Req) from the sequencer 32, the note data are sequentially read out from the FIFO 31 in an order in which they were written. The note data read out by the sequencer 32 is discarded from the FIFO 31. In addition to this FIFO function, the FIFO 31 has a function of monitoring the amount of note data stored therein, and a function of generating a note data empty signal (Empty) to set the note data empty flag in the status register of the interface 30 when the amount of note data becomes equal to or less than a predetermined amount of data (for example, 8 bytes). It should be noted that the note data empty signal is delivered as an interrupt request (IRQ) signal to the CPU 10 via the OR circuit 35.

When sequencer start instruction data (Start) is written into the sequencer control register of the interface 30 by the CPU 10, the sequencer 32 is instructed to start operation (start reproducing musical tones) to operate as outlined below. Before the sequencer 32 is instructed to start operation, however, tempo data (Temp) needs to be transferred to the sequencer 32, tone color data of each part needs to be written into the tone generator 33, and a certain amount of note data located at and after a performance starting position needs to be written into the FIFO 31.

The sequencer 32, first, captures note data at the leading end stored in the FIFO 31. The note data at the leading end is usually comprised only of interval data for sounding a first musical tone. After waiting for timing in which a waiting time based on the interval data and the temp data has elapsed, the sequencer 32 captures the next note data, and generates sounding parameters such as a key-on, a key-off, and a key code based on scale data and sounding tone length data of the captured note data, and supplies the sounding parameters to the tone generator 33.

The sequencer 32 then captures the following note data in the above timing, and prepares for the next reproduction. The preparation for the next reproduction means time management according to the captured noted data; the sequencer 32 manages time according to tempo data and interval data.

According to the supplied sounding parameters, the tone generator 33 generates musical tones of each part specified by the sounding parameters. In this case, the tone color of the musical tones generated in each part is assumed to be the tone color of the part set by the tone color data supplied in advance from the interface 30.

Then, after waiting for timing in which a period of time corresponding to the sounding tone length data included in the note data has elapsed, the sequencer 32 causes the tone generator 33 to stop generating musical tones. The sequencer 32 then carries out the above described generating process for note data captured next. The generating process is carried out until the user gives an instruction for ending reproduction.

When the instruction for ending reproduction is detected, the sequencer 32 and the tone generator 33 stop operation, and the CPU 10 clears all the data within the FIFO 31. Further, the sequencer 32 generates a musical composition data end signal (END), and writes positional information indicative of the end of reproduction as performance starting position information into the performance starting point register 36 via the interface 30 so that a continued portion of the musical composition data can be reproduced next time. It is preferred that in the performance starting point information written in the performance starting point register 36, the position of a mark detected first after the position of the musical composition data where reproduction thereof has been actually ended is designated as a starting point.

It should be noted that the instruction for ending reproduction is given when an incoming call button of the input section 17 is operated, a call-hold operation is canceled, or the communication line is cut off in the cellular phone 1.

The tone generator 33 generates PCM waveform data composed of a plurality of parts based on the sounding parameters such as a key-on, a key-off, and a key code, and outputs the same to the digital-to-analog converter 34. The digital-to-analog converter 34 converts the PCM waveform data into an analog musical tone signal. In the case where the musical tone signal is used as a melody for notifying the user of an incoming call, the generated melody is sounded via the incoming call speaker 23. Also, in the case where the musical tone signal is used as a melody for notifying the user of a call-hold, the generated melody (a sending hold sound) is supplied to the audio processing section 14, and is compression-encoded with high efficiency and transmitted to the caller.

The OR circuit 35 transmits an interrupt request (IRQ) signal to the CPU 10 in accordance with a note data empty signal (Empty) which is output from the FIFO 31 when the amount of note data stored in the FIFO 31 becomes equal to or smaller than a predetermined amount of data. The OR circuit 35 also generates an interrupt request (IRQ) signal to the CPU 10 in accordance with a musical data end signal (END) output from the sequencer 32.

In response to the interrupt request (IRQ) signal, the CPU 10 determines the cause of the interrupt request (IRQ) signal by making reference to the flag set in the status register of the interface 30 to thereby perform suitable processing.

On this occasion, when determining that the note data empty flag is set and hence the interrupt request (IRQ) signal is caused by a shortage in the amount of note data in the FIFO 31, the CPU 10 transfers note data of 32 bytes–8 bytes=24 bytes, for example. The CPU 10 transfers the note data by reading out the following note data from the RAM 11 or the ROM 12. The note data of 24 bytes should not necessarily be transferred immediately, and all the note data of 24 bytes should not necessarily transferred. It suffices that the note data is transferred in such timing and amount that the musical tone-generating section 15 reproduces musical tones without interruption.

Further, if the musical data end flag is set in the status register of the interface 30, the CPU 10 reads out the musical composition data again from the leading end thereof and transfers the same to the interface 30, or if a musical composition to be reproduced next has been designated, the CPU 10 reads out musical composition data thereof from the RAM 11 or the ROM 12 and transfers the same to the interface 30.

As described above, in the musical tone-generating section 15 appearing in FIG. 2, when the CPU 10 gives an instruction for starting reproduction of a melody, the sequencer 32 detects this instruction to start generating the melody. It should be noted that the instruction for starting reproducing a melody is given when reproduction of an alert sound (an incoming call melody) is started upon receipt of an incoming call by the cellular phone 1 or reproduction of a hold sound is started by operating the call-hold key of the cellular phone 1.

Therefore, in the cellular phone 1, a melody notifying the user of an incoming call can be reproduced and listened to from an arbitrary position of musical composition data set by the user. In this case, by operating an increment button and a decrement button, the user may store an arbitrary performance starting position in the performance starting point register 36 capable of storing performance starting point information on musical composition data. Since it is preferred that as the performance starting position, the position of a mark inserted into musical composition data is designated as a starting point, it may be configured such that each time the user operates the increment button or the decrement button, the performance starting position can be incremented/decremented so that the position of the next mark, which should be regarded as a performance starting position to be stored in the performance starting point register 36, can be designated as a starting point.

Figure 4:
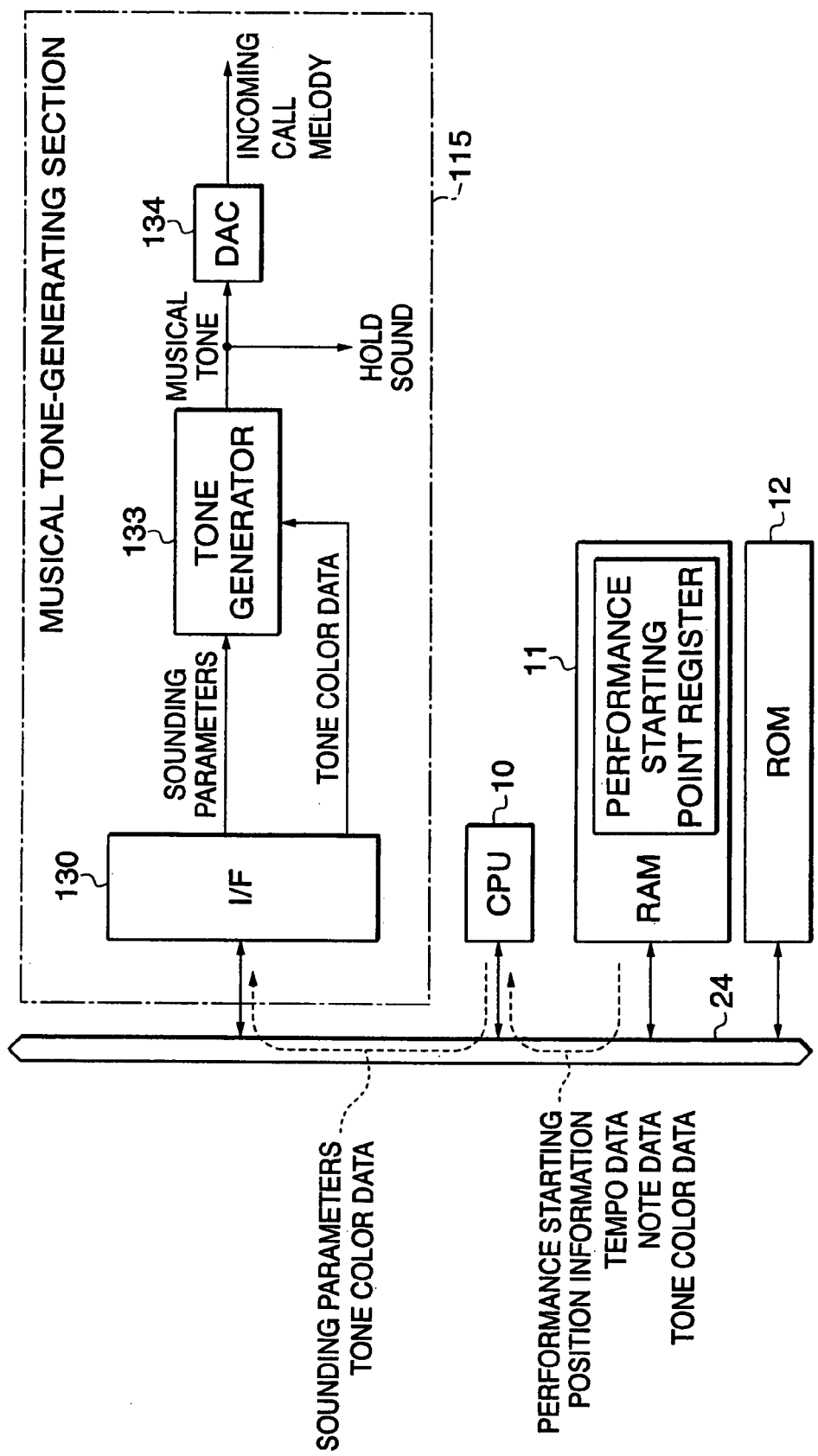
FIG. 4 is a diagram showing a second configuration of the musical tone-generating section.

FIG. 4 shows a second configuration of a musical-tone generating section of the FIG. 1 cellular phone 1 according to the present embodiment. In a musical tone-generating section 115 constructed according to the second configuration, the CPU 10 executes the sequence function. The data structure of musical composition data to be reproduced by the musical tone-generating section 115 constructed according to the second configuration is the same as the data structure described above with reference to FIG. 3.

The FIG. 4 musical tone-generating section 115 constructed according to the second configuration is also configured to start reproducing musical composition data from an arbitrary position thereof.

As shown in FIG. 4, the musical tone-generating section 115 is comprised of an interface (I/F) 130, a tone generator 133, and a digital-to-analog converter (DAC) 134.

The interface 130 is connected to the CPU 10 via the bus 24, so that sounding parameters generated by the CPU 10 as well as tone color data included in musical composition data read out from the RAM 11 or the ROM 12 are written into a data register incorporated in the interface 130 via the bus 24. The CPU1 10 generates the sounding parameters by reading out note data located at and after a performance starting position of the musical composition data stored in the RAM 11 or the ROM 12 and executing a sequence processing program based on the readout note data.

The interface 130 supplies the written sounding parameters as well as the tone color data to the tone generator 133. According to the supplied sounding parameters, the tone generator 133 generates musical tones of each part specified by the sounding parameters. In this case, the tone color of the musical tones generated for each part is assumed to be the tone color of the part set by the tone color data supplied from the interface 130. The tone generator 133 generates PCM waveform data composed of a plurality of parts based on the sounding parameters such as a key-on, a key-off, and a key code sequentially supplied from the interface 130, and outputs the same to the digital-to-analog converter 134. The digital-to-analog converter 134 converts the PCM waveform data into an analog musical tone signal. In the case where the musical tone signal is used as a melody for notifying the user of an incoming call, the generated melody is sounded via the incoming call speaker 34. On the other hand, in the case where the musical tone signal is used as a melody for notifying the user of a call-hold, the generated melody (sending hold sound) is supplied to the audio processing section 14, and is compression-encoded with high efficiency and transmitted to the caller.

A description will now be given of a musical composition reproducing process including a sequence process carried out by the CPU 10 which supplies sounding parameters to the musical tone-generating section 115 constructed according to the second configuration as described above.

When the receipt of an incoming call is detected or the call-hold key is operated and a call-hold is detected in the cellular phone 1, the CPU 10 starts generating a melody.

First, the CPU 10 reads out musical composition data for use in generating a melody from the RAM 11 or the ROM 12. In this case, first, the CPU 10 reads out tone color data and tempo data included in the musical composition data. Then, the CPU 10 reads out performance starting position information from the region of a performance starting point register reserved in the region of the RAM 11, and reads out musical composition data located at and after a position corresponding to the performance staring position information.

The CPU 10 writes tone color data of each part included in the readout musical composition data into the interface 130, and interprets note data located at and after the performance starting position included in the readout musical composition data. Note data at the leading end of the note data is comprised only of interval data for sounding a first musical tone. Then, after waiting for timing in which a waiting time based on the interval data and the tempo data read out from the RAM 11 or the ROM 12 has elapsed, the CPU 10 reads out the next note data, and generates sounding parameters such as a key-on, a key-off, and a key code based on scale data and sounding tone length data of the readout note data and writes the same into the data register incorporated in the interface 130.

Then, the CPU 10 reads out the following note data to prepare for the next reproduction. The preparation for the next reproduction means time management according to the following note data; the CPU 10 manages time according to the tempo data and the interval data.

The interface 130 supplies the sounding parameters written in the data register therein to the tone generator 133, and in accordance with the supplied sounding parameters, the tone generator 133 generates musical tones of each part specified by the sounding parameters. In this case, the tone color of musical tones generated in each part is assumed to be the tone color of the part set by the tone color data supplied in advance from the interface 130.

Then, after waiting for timing in which a period of time corresponding to the sounding tone length data included in the note data has elapsed, the CPU 10 causes the tone generator 133 to stop generating musical tones. The CPU 10 then carries out the above described musical tone-reproducing process for note data read out next. The CPU 10 carries out the musical tone-generating process until the user gives an instruction for ending reproduction.

When the instruction for ending reproduction is detected, the CPU 10 stops the sequence operation and causes the musical tone-generating section 115 to stop operation. Further, when a musical composition data end signal (END) is generated, the CPU 10 writes positional information indicative of the end of reproduction as performance starting position information into the performance starting point register of the RAM 12 so that a continued portion of the musical composition data can be reproduced next time. It is preferred that in the performance starting position information to be written into the performance starting point register, the position of a mark detected first after the position of the musical composition where reproduction has been actually ended is designated as a starting point.

It should be noted that the instruction for ending reproduction is given when the incoming call button of the input section 17 is operated, the call-hold operation is canceled, or the communication line is cut off in the cellular phone 1.

Figure 5:
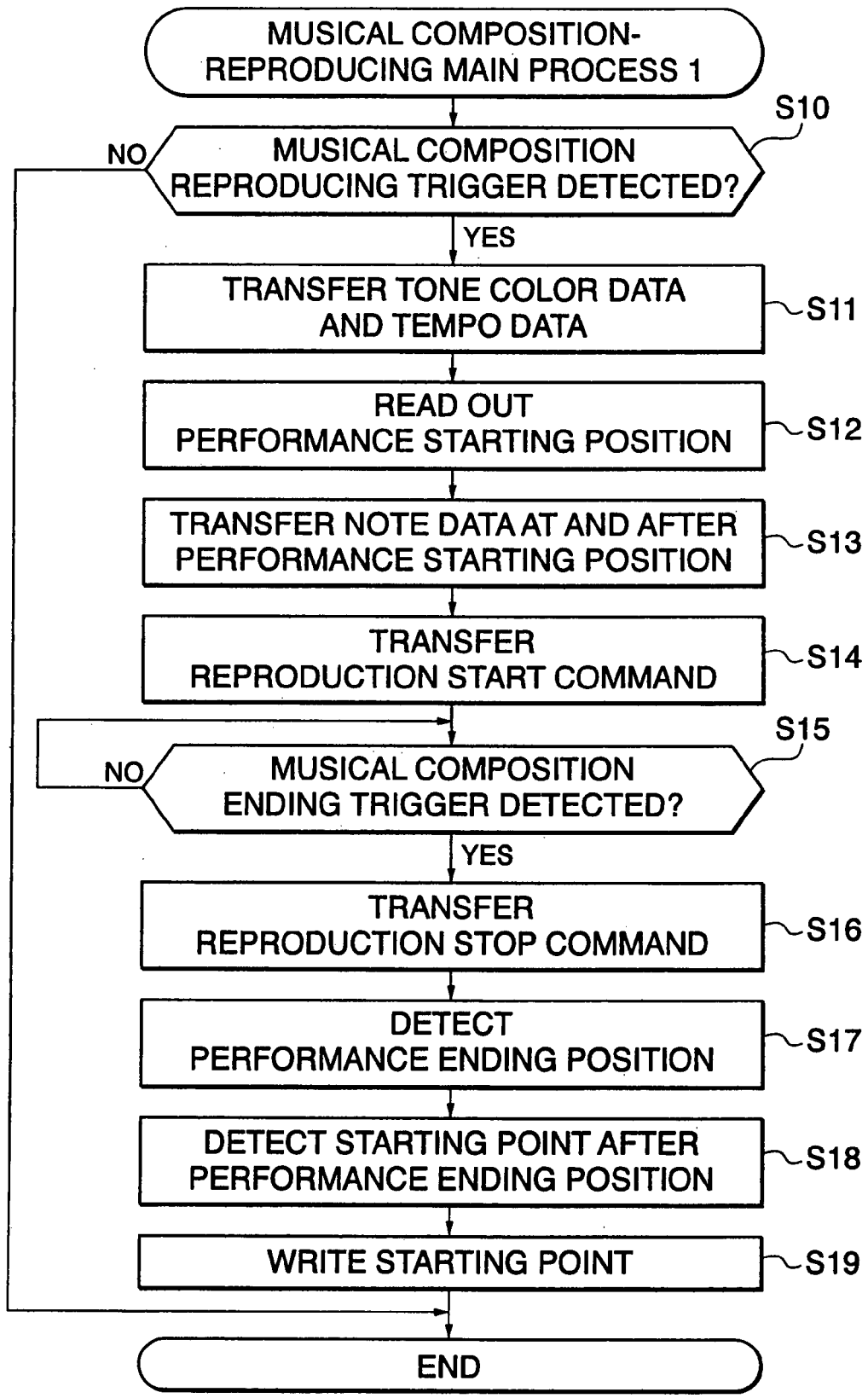
FIG. 5 is a flow chart showing a musical composition-reproducing main process 1 in the case where the musical tone-generating section is constructed according to the first configuration.

FIG. 5 is a flow chart showing a first musical composition-reproducing main process 1 carried out by the CPU 10 in the telecommunication terminal apparatus according to the present embodiment. Here, the musical composition-reproducing main process 1 will be described by making reference to the FIG. 2 musical tone-generating section 15 constructed according to the first configuration. It should be noted that the same process is carried out for the FIG. 4 musical tone-generating section 115 constructed according to the second configuration.

When the musical composition-reproducing main process 1 is started, the CPU 10 determines in a step S10 whether a musical composition-reproducing trigger has been detected or not. This musical composition-reproducing trigger is generated when the receipt of an incoming call is detected or the call-hold key is operated to hold a call in the cellular phone 1.

Here, when the CPU 10 detects the receipt of an incoming call or detects a call-hold, i.e. when the CPU 10 determines that the musical composition-reproducing trigger has been detected, the process proceeds to a step S11 wherein the CPU 10 transfers tone color data and tempo data included in musical composition data of the selected musical composition number from the RAM 11 or the ROM 12 and transfers the same to the musical tone-generating section 15.

Then, the process proceeds to a step S12 wherein the CPU 10 reads out a performance starting position included in performance starting position information written in the performance starting point register 36. The process then proceeds to a step S13 wherein the CPU 10 reads out musical composition data including note data located at and after the readout performance starting position, and transfers the musical composition data to the musical tone-generating section 15 until the FIFO 31 becomes full. The CPU 10 detects the extent to which the musical composition data has been transferred, and stores an address of the leading end of musical composition data which should be transferred next.

Then, in a step S14, the CPU 10 transfers a reproduction start command (Start) to the musical tone-generating section 15. As a result, the musical tone-generating section 15 reproduces musical tones based on the transferred tone color data, tempo data, and note data to start generating a melody. In this way, the musical tone-generating section 15 reproduces and sounds a melody from a performance starting position stored in the performance starting point register 36.

The musical tone-generating section 15 reproduces a musical composition until the CPU 10 detects a musical composition ending trigger in a step S15. This musical composition ending trigger is detected when the incoming call button of the input section 17 is operated or the call-hold operation is canceled in the cellular phone 1. Also, the musical composition ending trigger is detected when the communication line is cut off.

When the CPU 10 detects the musical composition ending trigger, the process proceeds to a step S16 wherein the CPU 10 transfers reproduction stop command data (Stop) to the musical composition-generating section 15 to cause the musical tone-generating section 15 to stop operation, and clears all the data within the FIFO 31. Then, in a step S17, the CPU 10 detects a performance ending position as the trailing end of the musical composition data having been reproduced when the musical tone-generating section 15 is caused to stop operation.

In a step S18, the CPU 10 compares the detected performance ending position with a starting point indicated by a mark inserted into the musical composition data. If they coincide with each other, the CPU 10 detects the starting point, and if they do not coincide with each other, the CPU 10 detects the closest starting point after the performance ending position.

Then, in a step S19, the CPU 10 writes the detected starting point as performance starting position information into the performance starting point register 36, and terminates the musical tone-reproducing main process 1. On the other hand, if the CPU 10 does not detect the musical composition reproducing trigger in the step S10, the CPU 10 directly terminates the musical composition-reproducing main process 1.

According to the above described musical composition-reproducing main process 1, the musical tone-generating section 15 reproduces and sounds musical composition data located at and after a performance starting position stored in the performance starting point register 36. On this occasion, a starting point coincident with a performance ending position or the closest starting point after the performance ending position is stored as performance starting position information in the performance starting point register 36, and hence when the musical composition-reproducing main process 1 is started next time, a continued portion of the musical composition data can be reproduced from the performance ending position where reproduction was ended or from a position suitable for starting performance after the performance ending position where reproduction was ended.

Figure 6:
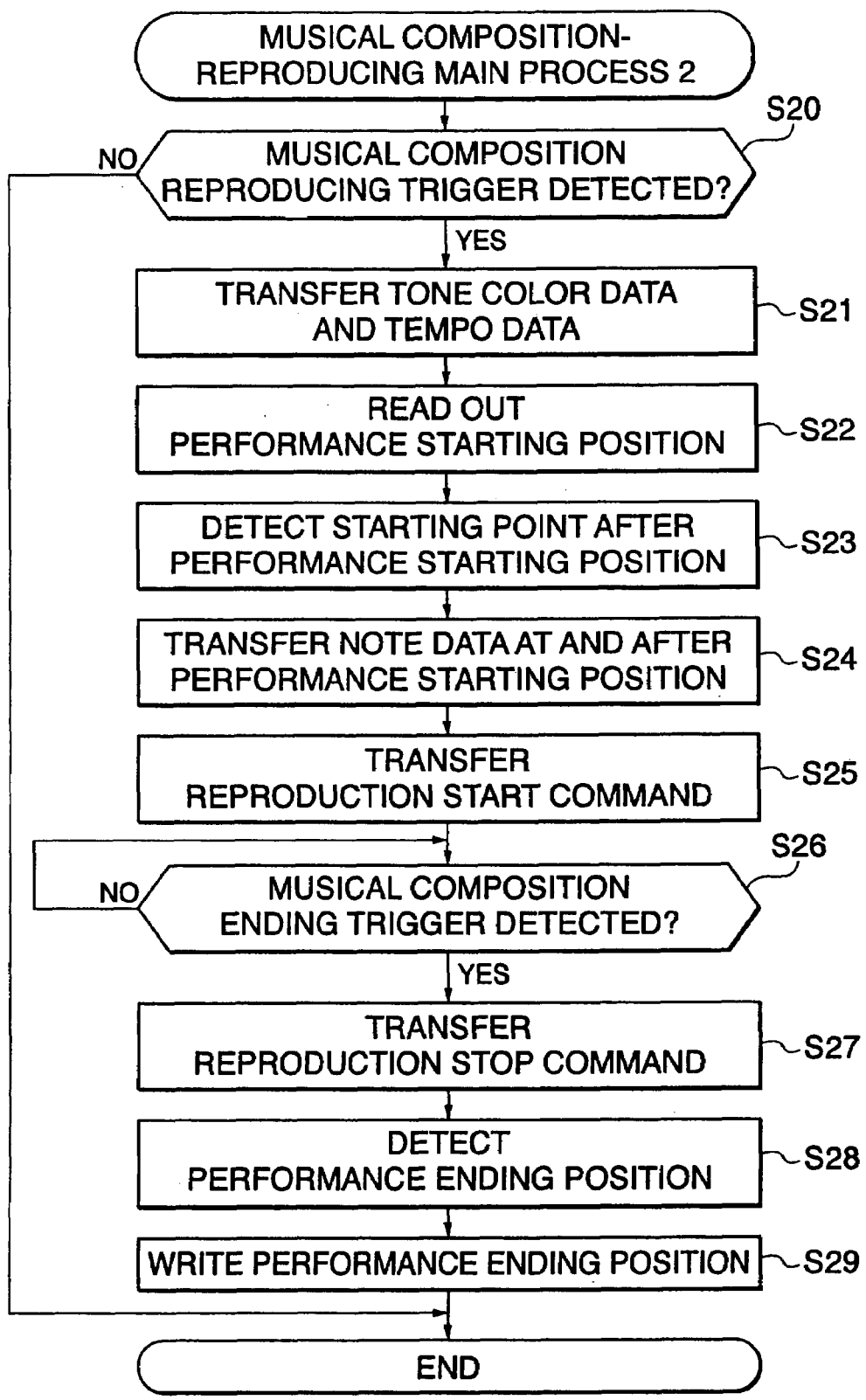
FIG. 6 is a flow chart showing a musical composition-reproducing main process 2 in the case where the musical tone-generating section is constructed according to the second configuration.

FIG. 6 is a flow chart showing a second musical composition-reproducing main process 2 carried out by the CPU 10 in the telecommunication terminal apparatus according to the present embodiment. In the musical composition-reproducing main process 2, the CPU 10 directly stores a performance ending position in the performance starting register 36. Here, the musical composition-reproducing main process 1 will be described by making reference to the FIG. 2 musical tone-generating section 15 constructed according to the first configuration. It should be noted that the same process is carried out for the FIG. 4 musical tone-generating section 115 constructed according to the second configuration.

When the musical composition-reproducing main process 1 is started, the CPU 10 determines in a step S20 whether a musical composition-reproducing trigger has been detected or not. This musical composition-reproducing trigger is generated when the receipt of an incoming call is detected or the call-hold key is operated to hold a call in the cellular phone 1.

Here, when the CPU 10 detects the receipt of an incoming call or detects a call-hold, i.e. when the CPU 10 determines the musical composition-reproducing trigger has been detected, the process proceeds to a step S21 wherein the CPU 10 transfers tone color data and tempo data included in musical composition data of the selected musical composition number from the RAM 11 or the ROM 12 and transfers the same to the musical tone-generating section 15.

The process then proceeds to a step S22 wherein the CPU 10 reads out a performance starting position from performance starting position information written in the performance starting point register 36. The process then proceeds to a step S23 wherein the CPU 10 compares the detected performance starting position with a starting point indicated by a mark inserted into the musical composition data. When they coincide with each other, the CPU 10 detects the starting point, and when they do not coincide with each other, the CPU 10 detects the closest starting point after the performance ending position. The process then proceeds to a step S24 wherein the CPU 10 reads out note data of musical composition data including note data located at and after the detected starting point, and transfers the note data to the musical tone-generating section 15 until the FIFO 31 becomes full. The CPU 10 detects the extent to which the musical composition data has been transferred, and stores an address of the leading end of musical composition data which should be transferred next.

Then, in a step S25, the CPU 10 transfers a reproduction start command (Start) to the musical tone-generating section 15. As a result, the musical tone-generating section 15 reproduces musical tones based on the transferred tone color data, tempo data, and note data to start generating a melody. In this way, the musical tone-generating section 15 reproduces and sounds a melody from a starting point coincident with a performance starting position stored in the performance starting point register 36, or from the closest starting point after the performance starting position when the starting point does not coincide with the performance starting position.

The musical tone-generating section 15 reproduces a musical composition until the CPU 10 detects a musical composition ending trigger in a step S26. This musical composition ending trigger is detected when the incoming call button of the input section 17 is operated or the call-hold operation is canceled in the cellular phone 1. The musical composition ending trigger is also detected when the communication line is cut off.

When the CPU 10 detects the musical composition ending trigger, the process proceeds to a step S26 wherein the CPU 10 transfers reproduction stop command data (Stop) to the musical composition-generating section 15, to cause the musical tone-generating section 15 to stop operation, and clears all the data stored in the FIFO 31. Next, in a step S28, the CPU 10 detects a performance ending position as the trailing end of the musical composition data having been reproduced when the musical tone-generating section 15 is caused to stop operation.

Then, in a step S29, the CPU 10 writes the detected starting point as performance starting position information into the performance starting point register 36, and terminates the musical tone-reproducing main process 2. On the other hand, if the CPU 10 does not detect the musical composition reproducing trigger in the step S20, the CPU 10 directly terminates the musical composition-reproducing main process 2.

According to the above described musical composition-reproducing main process 2, the musical tone-generating section 15 reproduces and sounds musical composition data from a starting point coincident with a performance starting position read out from the performance starting point register 36, or from the closest starting point after the performance starting position. Then, a performance ending position is stored as performance starting position information in the performance starting point register 36, and hence when the musical composition-reproducing main process 2 is started next time, a continued portion of the musical composition data can be reproduced from the performance ending position where reproduction was ended or from a position suitable for starting performance after the performance ending position where reproduction was ended.

It should be noted that the telecommunication terminal apparatus 1 according to the present embodiment is configured to carry out either one of the musical composition-reproducing main process 1 and the musical composition-reproducing main process 2.

Figure 7:
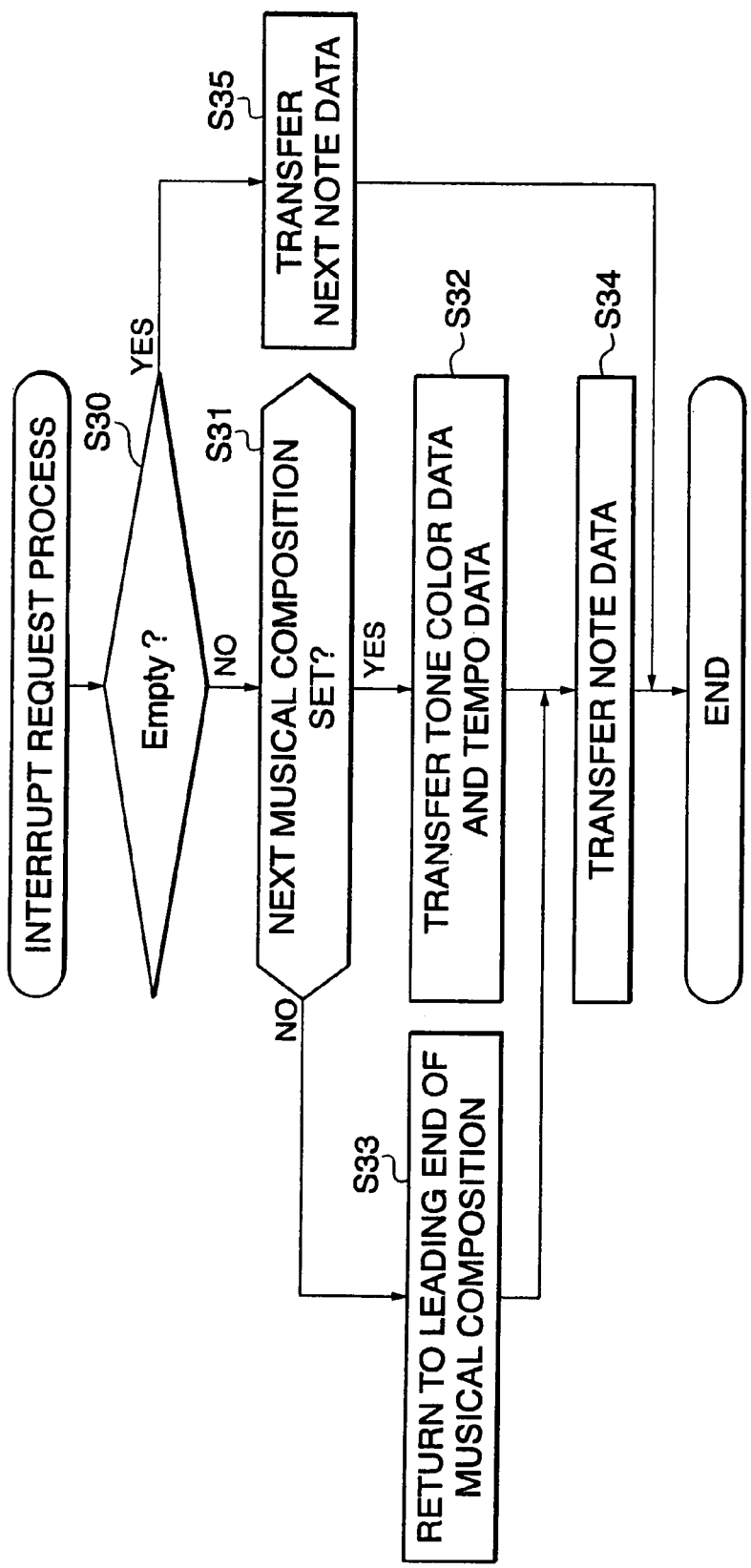
FIG. 7 is a flow chart showing an interrupt request process (IRQ process) in the case where the musical tone-generating section is constructed according to the first configuration.

By the way, the musical tone-generating section 15 may send an interrupt request (IRQ) signal to the CPU 10 while reproducing musical composition data. FIG. 7 is a flow chart showing an interrupt request process (IRQ process) carried out on this occasion. Here, the interrupt request process will be described by making reference to the FIG. 2 musical-tone generating section 15 constructed according to the first configuration. It should be noted that the same process is carried out for the FIG. 4 musical tone-generating section 115 constructed according to the second configuration. The interrupt request process is carried out between the steps S14 and S15 of the musical composition-reproducing main process 1 or between the steps S25 and S26 of the musical composition-reproducing main process 2.

When detecting the interrupt request signal, the CPU 10 determines in a step S30 whether the interrupt request signal results from a note data empty signal (Empty) or not by making reference to the status of the note data empty flag in the status register incorporated in the interface 30 of the musical tone-generating section 30. Since the note data empty flag, when set, indicates that there is a shortage in the amount of note data in the FIFO 31, the CPU 10 transfers the following note data to the musical tone-generating section 15 in a step S35, and terminates the interrupt request process.

On the other hand, if the note data empty flag is not set but the musical composition data end flag is set in the status register incorporated in the interface 30, i.e. if the reproduction of musical composition data has been ended, the CPU 10 determines that the result of the determination in the step S30 is negative (NO), and the process then proceeds to a step S31 wherein the CPU 10 determines whether musical composition data to be reproduced next has been set or not.

If the CPU 10 determines in the step S31 that musical composition data to be reproduced next has been set, the process proceeds to a step S32 wherein the CPU 10 reads out tone color data and tempo data included in the musical composition data to be reproduced next from the RAM 11 or the ROM 12 and transfers the same to the musical tone-generating section 15. Then, in a step S34, the CPU 10 transfers note data included in the musical composition data from the leading end thereof to the musical tone-generating section 15 until the FIFO 31 becomes full. On the other hand, if the CPU 10 determines in the step S31 that musical composition data to be reproduced next has not been set, the process branches to a step S33 wherein the CPU 10 returns to the leading end of the musical composition data of which reproduction has been ended, and the process proceeds to a step S34 wherein the CPU 10 transfers note data included in the musical composition data from the leading end thereof to the musical tone-generating section 15 until the FIFO 31 becomes full. The CPU 10 detects the extent to which the musical composition data has been transferred, stores an address of the leading end of musical composition data which should be transferred next, and terminates the interrupt requiring process.

It should be noted that when the cellular phone 1 is reset, the performance starting position information stored in the performance starting point register 36 is initialized. Also, when a musical composition as an incoming call melody is changed, the performance starting position information stored in the performance starting point register 36 is initialized.

As described above, according to the telecommunication terminal apparatus 1 of the present embodiment, the musical composition reproduction-related process and the telephone function process are executed by the CPU 10 in accordance with programs. The programs are preset in the ROM 12, but may be installed into the RAM 11 from the external device 20.

If the telecommunication terminal apparatus 1 according to the present embodiment is configured such that the programs are installed from the external device 20 as above, the programs can be easily replaced and version-updated. In this case, the external device 20 may be replaced by a drive for a removal disk such as a CD-ROM, an MO, or an HDD.

Further, the above described tone generator 33 (133) of the musical tone-generating section 15 (115) may be implemented by a tone generator based on a frequency-modulation tone generator method, i.e. an FM tone generator. The FM tone generator uses higher harmonics generated by frequency modulation to synthesize musical tones, and is capable of generating a waveform having higher harmonics components containing non-harmonic tones by a relatively simple circuit. The FM tone generator is capable of generating musical tones over a wide range from synthesized tones simulating musical tones of natural musical instruments to electronic tones.

Further, although note data included in musical composition data is transferred to the musical tone-generating section 15 until the FIFO 31 becomes full, alternatively, the note data may be transferred to the musical tone-generating section 15 until a predetermined amount of note data is stored in the FIFO 31.

The FM tone generator uses oscillators called operators that oscillate sinwaves equivalently, and can be formed by cascading a first operator and a second operator. Alternatively, the FM tone generator may be formed by feeding an operator's own output back to the operator itself.

Further, the tone generator 33 (133) of the musical tone-generating section 15 (115) should not necessarily be based on the FM tone generator method, but may be based on another method such as a waveform memory tone generator (PCM tone generator or ADPCM tone generator) method or physical model tone generator method, and may be implemented by either a hardware tone generator using a DSP or the like or a software tone generator realized by execution of a tone generator program.

It should be noted that the telecommunication terminal apparatus according to the present embodiment is by no means applied to only a cellular phone as described above, but may be applied to information apparatuses, personal computers, and so forth, which include musical tone-generating means.

INDUSTRIAL APPLICABILITY

As described above, the telecommunication terminal apparatus according to the present invention has point register means for storing information indicative of an arbitrary performance starting position of musical composition data, so that in response to an instruction for starting generation of a notification sound, the musical composition data is read out and reproduced according to the information indicative of the performance starting position stored in the point register means. Therefore, it is possible to reproduce and listen to musical composition data from an arbitrary position thereof.

Further, when an instruction for ending generation of a notification sound, information indicative of a reproduction ending position of musical composition data having been reproduced is written into the point register means, so that the musical composition data can be reproduced and listened to from a position where reproduction was previously ended. Further, a plurality of starting points suitable for starting performance are set in advance in musical composition data, and in response to an instruction for ending generation of a notification sound, a starting point closest to the notification sound ending position is written into the point register means, so that the musical composition data can be reproduced from a position suitable for starting performance. In this case, it may be arranged such that when an instruction for starting generation of a notification sound is given, musical composition data is reproduced from a starting point closest to a position stored in the point register means.

Further, one starting point is selected from among the plurality of starting points, the selected one starting point is written into the point register means as an arbitrary performance starting position, musical composition data may be reproduced from the selected one starting point.

The invention claimed is:

1. A telecommunication terminal apparatus operable for providing a notification using a melody, comprising:
    storage means configured to store musical composition data in which a plurality of starting points suitable for starting a performance are set;
    point register means for storing information indicative of an arbitrary performance starting position of the musical composition data; and
    musical tone-generating means responsive to an instruction for starting the notification using the melody, for reading out the musical composition data from said storage means and for reproducing the read out musical composition data according to the information indicative of the arbitrary performance starting position, stored in said point register means, to thereby start generating the melody from the arbitrary performance starting position of the musical composition data wherein
    said musical tone-generating means is responsive to an instruction for ending the notification using the melody, for stopping reproducing the musical composition data, for detecting a reproduction stop position of the musical composition data having been reproduced, and for writing a starting point corresponding to a rear position closest to the detected reproduction stop position among the plurality of starting points into said point register means.

2. A telecommunication terminal apparatus operable for providing a notification using a melody, comprising:
    storage means configured to store musical composition data in which a plurality of starting points suitable for starting a performance are set;
    point register means for storing information indicative of an arbitrary performance starting position of the musical composition data; and
    musical tone-generating means responsive to an instruction for starting the notification using the melody, for reading out the musical composition data from said storage means and for reproducing the read out musical composition data according to the information indicative of the arbitrary performance starting position, stored in said point register means, to thereby start generating the melody from the arbitrary performance starting position of the musical composition data wherein
    said musical tone-generating means is responsive to an instruction for ending the notification using the melody, for stopping reproducing the musical composition data, for detecting a reproduction stop position of the musical composition data having been reproduced, and for writing the detected reproduction stop position into said point register means, and said musical tone-generating means is responsive to the instruction for starting the notification using the melody, for generating the melody from a starting point corresponding to a rear position closest to the reproduction stop position stored in said point register means among the plurality of starting points.

3. A telecommunication terminal apparatus operable for providing a notification using a melody, comprising:
    storage means configured to store musical composition data in which a plurality of starting points suitable for starting a performance are set;
    point register means for storing information indicative of an arbitrary performance starting position of the musical composition data; and
    musical tone-generating means responsive to an instruction for starting the notification using the melody, for reading out the musical composition data from said storage means and for reproducing the read out musical composition data according to the information indicative of the arbitrary performance starting position, stored in said point register means, to thereby start generating the melody from the arbitrary performance starting position of the musical composition data wherein
    one starting point can be selected from among the plurality of starting points, and the selected one starting point is written as the arbitrary performance starting position into said point register means.

4. A telecommunication terminal apparatus operable for providing a notification using a melody, comprising:
    storage means capable of storing musical composition data in which a plurality of starting points suitable for starting performance are set;
    point register means for storing information indicative of an arbitrary performance starting position of the musical composition data; and
    musical tone-generating means responsive to an instruction for starting the notification using the melody, for reading out the musical composition data from said storage means and for reproducing the read out musical composition data according to the information indicative of the arbitrary performance starting position, stored in said point register means, to thereby start generating the melody from the arbitrary performance starting position of the musical composition data,
        wherein said point register means is operable for storing, as the information indicative of the arbitrary performance starting position, a starting point coincident with a performance ending position of the musical composition data among the plurality of starting points set in the musical composition or the closest starting point after the performance ending position among the plurality of starting points.

5. A telecommunication terminal apparatus operable for providing a notification using a melody, comprising:
    storage means operable for storing musical composition data in which a plurality of starting points suitable for starting performance are set;
    point register means for storing information indicative of an arbitrary performance starting position of the musical composition data; and
    musical tone-generating means responsive to an instruction for starting the notification using the melody, for comparing the information indicative of the arbitrary performance starting position stored in the point register means with the plurality of starting points set in the musical composition data, and for detecting the starting point coincident with the performance ending position among the plurality of starting points or the closest starting point after the performance ending position among the plurality of starting points and reproducing the musical composition data according to the detected the starting point, to thereby start generating the melody from the arbitrary performance starting position of the musical composition data, wherein said point register means is operable for storing, as the information indicative of the arbitrary performance starting position, a performance ending position of the musical composition data which has been reproduced by said musical tone-generating means.

* * * * *